United States Patent
Rother et al.

(10) Patent No.: US 8,041,114 B2
(45) Date of Patent: Oct. 18, 2011

(54) OPTIMIZING PIXEL LABELS FOR COMPUTER VISION APPLICATIONS

(75) Inventors: Carsten Rother, Cambridge (GB);
Victor Lempitsky, Moscow (RU);
Vladimir Kolmogorov, Ipswich (GB)

(73) Assignee: Microsoft Corporation, Redmond, WA (US)

( * ) Notice: Subject to any disclaimer, the term of this patent is extended or adjusted under 35 U.S.C. 154(b) by 1130 days.

(21) Appl. No.: 11/764,002

(22) Filed: Jun. 15, 2007

(65) Prior Publication Data

US 2008/0310743 A1 Dec. 18, 2008

(51) Int. Cl.
*G06K 9/34* (2006.01)
(52) U.S. Cl. ........................................... 382/173
(58) Field of Classification Search .................... 382/173
See application file for complete search history.

(56) References Cited

U.S. PATENT DOCUMENTS

| | | | |
|---|---|---|---|
| 6,078,688 A | 6/2000 | Cox et al. | |
| 6,718,063 B1 * | 4/2004 | Lennon et al. | 382/224 |
| 6,744,923 B1 | 6/2004 | Zabih et al. | |
| 6,762,769 B2 | 7/2004 | Guo et al. | |
| 6,973,212 B2 | 12/2005 | Boykov et al. | |
| 7,139,409 B2 | 11/2006 | Paragios et al. | |
| 7,209,581 B2 | 4/2007 | Zhang et al. | |
| 7,212,201 B1 | 5/2007 | Geiger et al. | |
| 2005/0271273 A1 * | 12/2005 | Blake et al. | 382/173 |
| 2006/0029275 A1 * | 2/2006 | Li et al. | 382/173 |
| 2006/0039611 A1 * | 2/2006 | Rother et al. | 382/199 |
| 2006/0104542 A1 * | 5/2006 | Blake et al. | 382/284 |
| 2006/0147116 A1 * | 7/2006 | Le Clerc et al. | 382/173 |
| 2006/0214932 A1 | 9/2006 | Grady et al. | |
| 2006/0285747 A1 * | 12/2006 | Blake et al. | 382/180 |
| 2006/0291721 A1 | 12/2006 | Torr et al. | |

FOREIGN PATENT DOCUMENTS

| | | |
|---|---|---|
| JP | 60200379 A | 10/1985 |
| JP | 2002230540 A | 8/2002 |
| JP | 2003222074 A | 8/2003 |
| JP | 2007105368 A | 4/2007 |
| JP | 2007192130 A | 8/2007 |

OTHER PUBLICATIONS

Rother et al., Optimizing Binary MRFs via Extended Roof Duality, cvpr, pp. 1-8, 2007 IEEE Conference on Computer Vision and Pattern Recognition, Jun. 17-22, 2007.*

Kolmogorov et al., Minimizing non-submodular functions with graph cuts—a review, Microsoft Research Technical Report MSR-TR-2006-100, Jul. 2006, pp. 1-15.*

Kolmogorov et al., Minimizing Nonsubmodular Functions with Graph Cuts—A Review, IEEE Transactions on Pattern Analysis and Machine Intelligence, vol. 29, Issue 7, Jul. 2007, pp. 1274-1279.*

(Continued)

*Primary Examiner* — David Zarka
(74) *Attorney, Agent, or Firm* — Lee & Hayes, PLLC (57) ABSTRACT

Computer vision applications often require each pixel within an image to be assigned one of a set of labels. A method of improving the labels assigned to pixels is described which uses the quadratic pseudoboolean optimization (QPBO) algorithm. Starting with a partially labeled solution, an unlabeled pixel is assigned a value from a fully labeled reference solution and the energy of the partially labeled solution plus this additional pixel is calculated. The calculated energy is then used to generate a revised partially labeled solution using QPBO.

20 Claims, 6 Drawing Sheets

OTHER PUBLICATIONS

Raj et al., MRF's for MRI's: Bayesian Reconstruction of MR Images via Graph Cuts, cvpr, vol. 1, pp. 1061-1068, 2006 IEEE Computer Society Conference on Computer Vision and Pattern Recognition—vol. 1 (CVPR'06), 2006.*

Beasley, "Heuristic Algorithms for the Unconstrained Binary Quadratic Programming Problem", 1998, pp. 36.

Soros, et al., "Local Search Heuristics for Unconstrained Quadratic Binary Optimization", Rutcor Research Report, 2005, pp. 39.

Boros, et al., "Preprocessing of Unconstrained Quadratic Binary Optimization", Rutcor Research Report, 2006, pp. 58.

Boros, et al., "Pseudo-Boolean Optimization", 2001, pp. 83.

Boykov, et al., "Markov Random Fields with Efficient Approximations", available at least as early as May 16, 2007, at <<http://www.cs.cornell.edu/~rdz/Papers/BVZ-cvpr98.pdf>>, pp. 8.

Hammer, et al., "Roof Duality, Complementation and Persistency in Quadratic 0-1 Optimization", Mathematical Programming, 1984, pp. 121-155.

Szeliski, et al., "A Comparative Study of Energy Minimization Methods for Markov Random Fields", pp. 17.

Wu, et al., "Cross Entropy: A New Solver for Markov Random Field Modeling and Applications to Medical Image Segmentation", at <<http://www.cs.ust.hk/~achung/miccai05_wu_chung.pdf>>, Springer-Verlag Berlin Heidelberg, 2005, pp. 9.

PCT Search Report dated Nov. 25, 2008 for corresponding PCT Application No. PCT/US2008/065969, 4 pages.

Kohli, et al., "Efficiently Solving Dynamic Markov Random Fields Using Graph Cuts", Tenth IEEE International Conference on Computer Vision, Oct. 17-21, 2005, pp. 8.

Kolmogorov, et al., "Minimizing Non-Submodular Functions With Graph Cuts—A Review", Microsoft Research Technical Report: MSR-TR-2006-100, Jul. 2006, pp. 1-15.

Kolmogorov, et al., "What Energy Functions Can be Minimized Via Graph Cuts?", IEEE Transactions on Pattern Anaylsis and Machine Intelligence, Feb. 2004, vol. 26 No. 2) pp. 147-159.

* cited by examiner

OPTIMIZING PIXEL LABELS FOR COMPUTER VISION APPLICATIONS

BACKGROUND

Many computer vision problems involve assigning a label to each pixel within an image. These labels may indicate whether the pixel is part of the background or foreground (e.g. for image segmentation) or whether the pixel is part of an electronic ink stroke or not (e.g. for electronic ink recognition). Depending on the application, the label may be selected from two possible labels or from a larger number of labels.

A number of techniques have been developed and applied to such computer vision problems, such as graph cut, tree-reweighted message passing (TRW), belief propagation (BP), iterated conditional modes (ICM) and simulated annealing (SA).

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Computer vision applications often require each pixel within an image to be assigned one of a set of labels. A method of improving the labels assigned to pixels is described which uses the quadratic pseudoboolean optimization (QPBO) algorithm. Starting with a partially labeled solution, an unlabeled pixel is assigned a value from a fully labeled reference solution and the energy of the partially labeled solution plus this additional pixel is calculated. The calculated energy is then used to generate a revised partially labeled solution using QPBO.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Most early vision problems can be formulated in terms of Markov random fields (MRFs) and therefore algorithms for MRF inference are very important for computer vision. The MAP-MRF approach (computing maximum a posteriori configurations in an MRF) has proven to be extremely successful for many vision applications such as stereo, image segmentation, image denoising, superresolution, new view synthesis and others. A special class of MRFs are binary MRFs.

The problem of minimizing an energy function of the following form can be considered:

$$E(x) = \theta_{const} + \sum_{p \in v} \theta_p(x_p) + \sum_{(p,q) \in \varepsilon} \theta_{pq}(x_p, x_q). \qquad (1)$$

Here $G=(V,E)$ is an undirected graph. The set of nodes V may correspond to pixels, and $x_p \in \{0, 1\}$ denotes the label of node p. If the function E is submodular, i.e. every pairwise term $\theta_{pq}$ satisfies $$\theta_{pq}(0,0)+\theta_{pq}(1,1) \leq \theta_{pq}(0,1)+\theta_{pq}(1,0), \qquad (2)$$

then a global minimum of E can be computed in polynomial time as a minimum s-t cut in an appropriately constructed graph ("submodular graph cuts"). Note, there are many different energies, which include discrete labels, which can be converted into the form (1). For instance if the energy is of form (1) but the label set is non-binary, e.g. a variable has a value between 0 and n. Also, any energy with higher order terms i.e. theta depends on more than two variables, can be transformed into form (1) as shown in the paper by V. Kolmogorov and R. Zabih entitled 'What Energy Functions can be Minimized via Graph Cuts?' and presented at ECCV '02 for the case of order 3 terms. In many vision applications, however, the submodularity condition is not satisfied, i.e. the functions are general and may contain non-submodular and submodular term, and minimizing such functions is a very challenging task (in general, NP-hard).

An approach for this problem has been proposed called roof duality and this is described in 'Roof duality, complementation and persistency in quadratic 0-1 optimization' by P. L. Hammer, P. Hansen, and B. Simeone, published in Mathematical Programming, 28:121-155, 1984. An algorithm for computing a roof dual is described in 'Network flows and minimization of quadratic pseudo-Boolean functions' by E. Boros, P. L. Hammer, and X. Sun, published as Technical Report RRR 17-1991, RUTCOR, May 1991. This algorithm can be viewed as a generalization of the standard graph cut algorithm and is referred to as the QPBO (quadratic pseudo-boolean optimization) algorithm.

In some cases, the roof duality approach (and the QPBO algorithm) leaves many nodes unlabeled. Methods are described below which takes a fully labeled solution, which may be generated by taking the partially labeled solution generated using QPBO and allocating labels to the unlabelled nodes (or alternatively, takes any other input solution), and attempts to improve (i.e. decrease) the input solution's energy. Using the methods described, the energy is guaranteed not to increase, and often decreases. The methods are referred to as QPBOI (quadratic pseudoboolean optimization improved).

Figure 1:
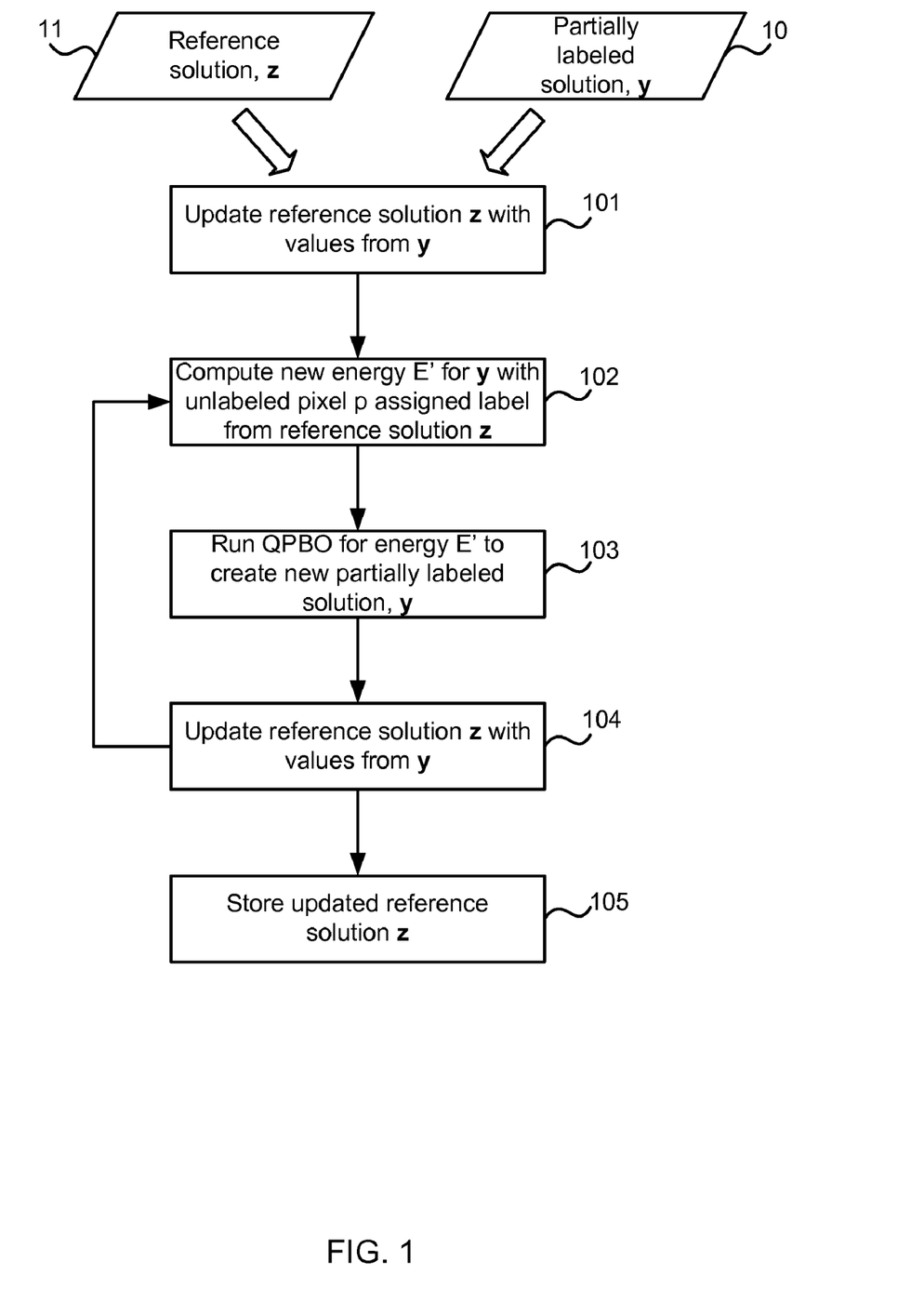
FIG. 1 is an example flow diagram of a method of improving labeling of pixels.

FIG. 1 is an example flow diagram of a method of improving labeling of pixels, which starts with a partially labeled solution, y, 10 which may have been generated using QPBO. A reference solution, z, 11 is also available which is a fully labeled solution and which may have been generated using any method, including but not limited to, BP or random assignment of labels, or QPBO in combination with either of these techniques. It is the labeling within this reference solution z which is improved through use of the methods described herein. According to the method of FIG. 1, where the reference solution z is not generated from the partially labeled solution y, the reference solution may be updated with values from the partially labeled solution y, (block 101), i.e. for each pixel in z, the label is updated to correspond to the label in y unless the pixel is unlabeled in y. Where the reference solution z is generated initially from the partially labeled solution y, (e.g. through random assignment of labels to those unlabeled pixels), this step (block 101) may be omitted initially (although it may be included in subsequent iterations, as described below). A new energy E' is derived from the given energy E where the value ($x_p$) of one of the unlabeled pixels, p, in y is fixed to the value of that pixel in the reference solution z (block 102). QPBO is run for this new energy E' to provide an updated partially labeled solution y (block 103). The reference solution z is updated (block 104) to create an improved fully labeled solution. The process may be repeated (blocks 102-104) several times, for example until the reference solution z has not changed for a defined number of iterations (as described below and shown in FIG. 4). Upon completion (or also at intermediate stages), the improved fully labeled solution may be stored (block 105). This may comprise storing a labeled version of the image which comprises a label associated with each pixel, where the labels are as detailed in the improved fully labeled solution.

Figure 2:
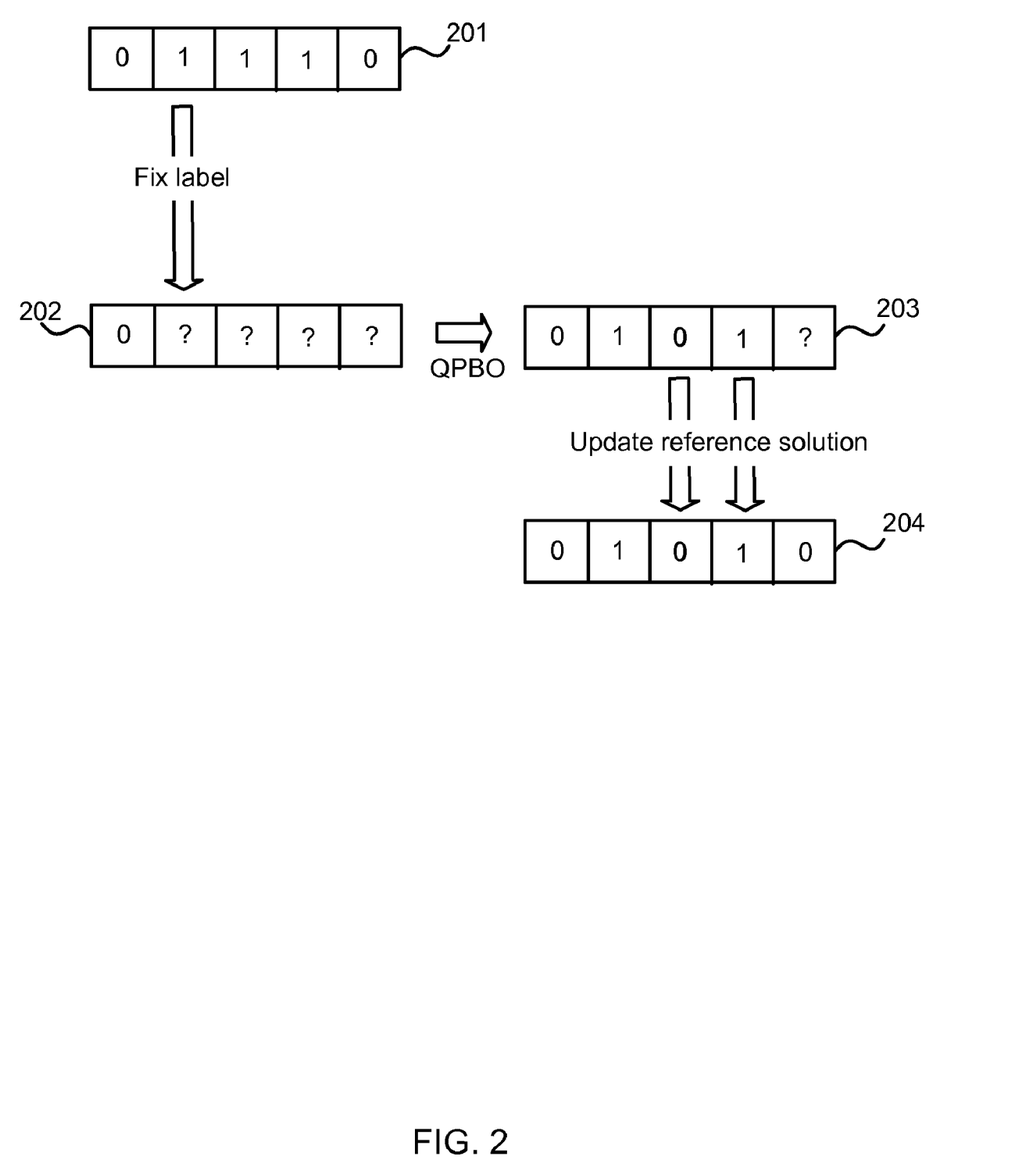
FIG. 2 shows a simple graphical representation of the method of FIG. 1.

FIG. 2 shows a simple graphical representation of this method where there are just five pixels. Initially there is a fully labeled reference solution 201, which may have been generated randomly, using BP or in any other way, and a partially labeled solution 202 in which only the first pixel is labeled, (the unlabeled pixels are identified with a question mark). The value of the $2^{nd}$ pixel is fixed at the value in the reference solution 201 (label=1 in this example) and when QPBO is run (in block 105), it may produce a new partially labeled solution 203 where fewer pixels are unlabeled and in the example shown it has additionally labeled the $3^{rd}$ and $4^{th}$ pixels leaving only the $5^{th}$ pixel unlabeled. This operation may be referred to as 'spreading' because the area of labeled pixels has spread during this operation beyond the one pixel which was fixed. The reference solution 201 may therefore be updated based on the new partially labeled solution 203 to create an updated fully labeled reference solution 204.

The operation of block 103 may be referred to as "fixing a node", which refers back to the graph notation where G=(V,E) is an undirected graph, the set of nodes V may correspond to pixels, and $y_p \in \{0,1\}$ denotes the label of node p (as described above). The method of FIG. 1 may then be described as follows: Let y=QPBO(E) i.e. the initial partially labeled solution 10 may be generated using QPBO. Consider unlabeled node p with $y_p = \emptyset$ and given label $i \in \{0, 1\}$. Define energy E'=E[p←i] as follows: E'(y)=E(y)+$E_p(y_p)$ where $E_p$ is a "hard constraint" term with $E_p(i)=0$, $E_p(1-i)=C_p$ and $C_p$ is a sufficiently large constant. If QPBO is run for energy E' (as in block 105, with E' corresponding to the new E calculated in block 104) then a new partial labeling y' is obtained in which more nodes may have become labeled.

The fact that the energy is guaranteed not to increase is a result of a property of QPBO referred to as weak autarky:

Let x be an arbitrary complete labeling, and let z=FUSE(x, y) be the "fusion" of x and y: $z_p = y_p$ if $p \in$ dom(y), and $z_p = x_p$ otherwise. Then E(z)≤E(x). Dom(y) denotes the set of labeled nodes in y (referred to as the 'domain of y').

The unlabeled pixel, p, for which the label is fixed in block 102, may be selected according to a predefined ordering of pixels (also referred to as nodes) or may be selected randomly. By using an ordering of nodes $\pi: V \rightarrow \{1, \ldots, |V|\}$, the internal structures used in performing QPBO can be re-used when QPBO is run again which results in an increase in the speed of performing the operation of one or more orders of magnitude.

Figure 3:
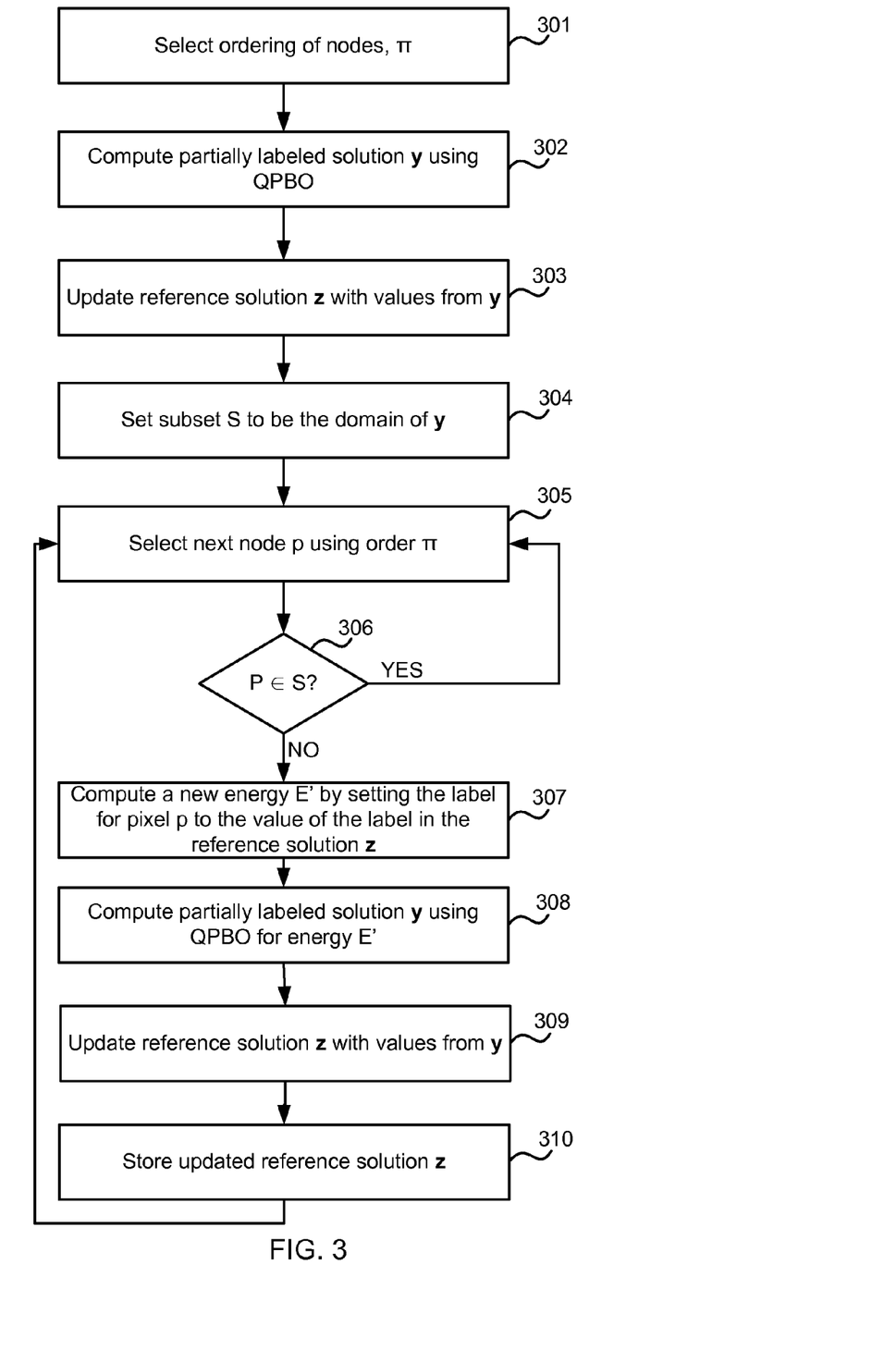
FIG. 3 is a second example flow diagram of a method of improving labeling of pixels.

The algorithm may also be run starting from a completely labeled approximate solution and using QPBO to generate the initial partially labeled solution. The complete approximate solution may be considered the initial reference solution z. In such a situation the method may be as shown in FIG. 3 and can be written mathematically as:

Select an ordering of nodes $\pi$ (block 301).
Initialization:
  Compute y=QPBO(E) (block 302)
  Set z:=FUSE(z, y), S:=dom(y) (blocks 303 and 304)
For nodes $p \in V$ do in the order $\pi$(block 305):
  If $p \notin S$ compute y=QPBO(E[S ∪ {p}←z]) (blocks 306-308)
  Set z:=FUSE(z, y), S:=dom(y) (blocks 309)

As described above, in order to achieve efficiency, a nested sequence of subsets S may be used according to the ordering of nodes $\pi$. This enables reuse of flow and search trees (e.g. as described in 'Efficiently solving dynamic Markov random fields using graph cuts' by P. Kohli and P. H. S. Torr, published at ICCV in October 2005) when QPBO is run repeatedly. Upon completion (i.e. having iterated for all $p \in V$) or at an earlier stage, the updated reference solution may be stored (block 310).

The computation of QPBO can be described in more detail using the notation of reparameterization, which is described in 'Minimizing non-submodular functions with graph cuts—a review' by V. Kolmogorov and C. Rother, to be presented at PAMI 2007. An overview is provided below.

The energy of equation (1) is specified by the constant term $\theta_{const}$, unary terms $\theta_p(i)$ and pairwise terms $\theta_{pq}(i, j)$ ($i, j \in \{0, 1\}$). These last two terms may be denoted as $\theta_{p;i}$ and $\theta_{pq;ij}$, respectively. All these values can be concatenated into a single vector $\theta = \{\theta_\alpha | \in I\}$ where the index set is $$I = \{const\} \cup \{(p;i)\} \cup \{(pq;ij)\}$$

Note that (pq; ij)≡(qp; ji), so $\theta_{pq;ij}$ and $\theta_{qp;ji}$ are the same element. The notation $\theta_p$ may be used to denote a vector of size 2 and $\theta_{pq}$ may be used to denote a vector of size 4.

Vector $\theta'$ is called a reparameterization of vector $\theta$ if the energy functions E' and E that they define are the same, i.e. E'(x)=E(x) for all labelings x. As a particular example, a constant can be subtracted from vectors $\theta_p$ or $\theta_{pq}$ and the same constant added to $\theta_{const}$. Another possible transformation involves edge $(p, q) \in E$ and label $j \in \{0, 1\}$: a constant can be subtracted from components $\theta_{pq;ij}$ for all $i \in \{0, 1\}$ and the same constant added to $\theta_{p;j}$.

A vector $\theta$ is considered to be in normal form if it satisfies the following:

$$\min\{\theta_{p;0}, \theta_{p;1}\} = 0 \text{ for all nodes p.} \quad (a)$$

$$\min\{\theta_{pq;0j}, \theta_{pq;1j}\} = 0 \text{ for all } (p,q) \in E \text{ and } j \in \{0,1\}. \quad (b)$$

Normal form implies the following: $\theta_{pq;00} = \theta_{pq;11} = 0$, $\theta_{pq;01}$, $\theta_{pq;10} \geq 0$ if edge (p, q) is submodular; and $\theta_{pq;01} = \theta_{pq;10} = 0$, $\theta_{pq;00}$, $\theta_{pq;11} \geq 0$ if (p, q) is supermodular.

The first step of the QPBO algorithm is to reparameterize vector θ into a normal form. This can be done in linear time. Then a directed weighted graph G=(V,A) is constructed. For each node p ∈ V, two nodes p,p̄ are added to V. These two nodes correspond to variable $x_p$ and its negation $\bar{x}_p=1-x_p$, respectively. In addition, there are two special nodes—the source s and the sink t which correspond to labels 0 and 1. Thus, V={p,p̄|p∈v}∪{s,t}. For each non-zero element $\theta_\alpha$ (except for $\theta_{const}$) two directed arcs are added to the graph with weight $\theta_\alpha$. Finally, a minimum s-t cut (S, T) in G is computed by computing a maximum flow from s to t. This cut gives an optimal solution to the LP relaxation and corresponding partial labeling x as follows:

$$x_p \begin{cases} 0 & \text{if } p \in S, \bar{p} \in T \\ 1 & \text{if } p \in T, \bar{p} \in S \\ \phi & \text{otherwise} \end{cases}$$

The maximum flow in G defines a reparameterization of the energy. There are certain relations between this reparameterization and partial labeling x (e.g. complementary slackness conditions).

Graph G may have several minimum cuts (S, T) which correspond to different partial labelings x with different sets of labeled nodes. In general, there exist "extreme" cuts ($S^{min}$, $T^{min}$) and ($S^{max}$, $T^{max}$) such that for any other minimum cut (S, T) there holds dom($x^{min}$) ⊂ dom(x) ⊂ dom($x^{max}$) where $x^{min}$, $x^{max}$, and x are the labelings defined by these cuts and dom(x) denotes the set of labeled nodes in x. Cut ($S^{min}$, $T^{min}$) can be set as follows: nodes reachable from s through non-saturated arcs are in $S^{min}$, and all other nodes are in $T^{min}$. Alternatively, $T^{min}$ can be set to be the set of nodes from which t can be reached through non-saturated arcs and this yields the same labeling $x^{min}$. Computing cut ($S^{max}$, $T^{max}$) can be done, for example, by analyzing strongly connected components of the residual graph. Note that nodes in dom($x^{min}$) are labeled uniquely by any minimum cut (S, T). The labeling of nodes in dom($x^{max}$)-dom($x^{min}$), however, may depend on the cut.

The fixing of a node p ∈ V to a particular label, e.g. label 0, can be done by adding arcs (s→p) and (p̄→t) with a large weight C, or setting $c_p := c_p + C, c_{\bar{p}} := c_{\bar{p}} - C$ After that flow is pushed in G using operations so that all arcs (p→v), (v̄→p̄) ∈ $A^{int}$ become saturated (i.e. their residual capacities become zeros), $c_p$ becomes positive, and $c_{\bar{p}}$ becomes negative. These conditions can always be ensured if C is sufficiently large. It is easy to verify by induction that from now no augmenting path from s to t will go through nodes p,p̄. Indeed, there are no non-saturated outgoing arcs from p other than to s, and there no non-saturated incoming arcs to p̄ other than from t. Therefore, removing nodes p,p̄ together with incident edges will not affect the output of QPBO.

Instead of fixing nodes, (as in blocks 103 and 307), hard constraints satisfied by current labeling z can be enforced via contracting nodes of the energy and adding non-negative numbers to elements $\theta_\alpha$ such that the cost of z stays the same. For example by contracting nodes p, q for existing edges (p, q). If $x_p \neq x_q$ then node q is flipped (i.e its label is swapped) before contraction. Edges are processed in the order selected at random in the beginning. Edges which are submodular with respect to the current labeling z are not contracted (as this would not label more nodes); instead, they are moved to the next iteration. At convergence, all edges of the energy are submodular with respect to labeling z.

Whilst the above description refers to the use of QPBO, extensions of (or variations of) QPBO may be used instead of, or in addition to, QPBO. An example of such an extension is the probing method described in the technical report by E. Boros, P. L. Hammer, and G. Tavares, entitled 'Preprocessing of unconstrained quadratic binary optimization' (Technical Report RRR 10-2006, RUTCOR, April 2006). This extension may be referred to as QBPOP (QBPO Probing).

The resultant labeling achieved using QPBOI as described above may be considered stable (or QPBO-stable) if no QPBOI operation can change it, i.e. for any subset S ⊂ V there holds $y_p = z_p$ for p∈dom(y) where y=QPBO(E[S→z]).

Figure 4:
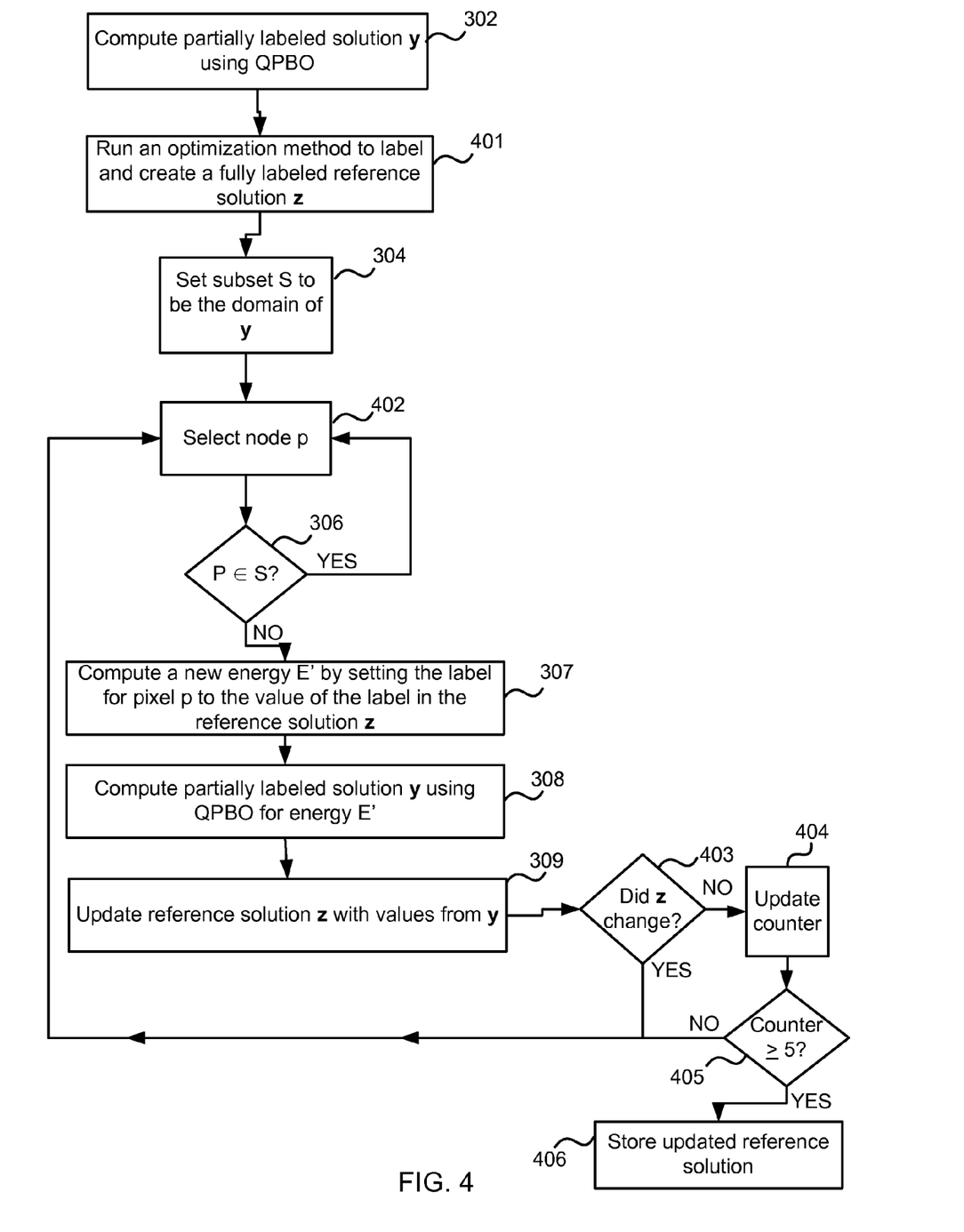
FIG. 4 is a third example flow diagram of a method of improving labeling of pixels.

As described above, QPBOI may be initialized in any way, for example by generating a random reference solution z and this may be referred to as 'Rand+I'. QPBOI is used to improve on this input reference solution. In another example, QPBO may first be run (as shown in FIG. 4, block 302), to obtain a partially labeled solution and then run an optimization technique may run (block 401), but only for unlabeled nodes. An example of an optimization technique is max-product BP. The solution is then improved using QPBOI (blocks 304, 402, 306-309) with random permutations of nodes (as selected in blocks 402). A "sequential" schedule of BP as may be used. Before starting the optimization method (in block 401), the energy may be reparameterized the energy so that $\theta_{pq;00} = \theta_{pq;11}$, and $\theta_{pq;01} = \theta_{pq;10}$ for each edge (p, q). QPBOI may stopped when the complete labeling has not changed for a defined number of iterations, such as 5 iterations (blocks 403-405), and Optimization method, e.g. BP, may run for a large number of iterations (e.g. 1000) and the best result is taken. This combination of QPBOI with BP may be referred to as 'BP+I'. Once QPBOI is stopped, the updated reference solution may be stored (block 406).

In a further example, QBPOP may first be run, obtaining energy E' and mapping f:$2^{v'} \to 2^v$. Then BP+I is applied for energy E' giving solution y∈$2^{v'}$. The output of this (P+BP+I) is the labeling z=f(y). In yet another example QBPOP and QPBOI may be combined. The basic step of the QBPOP is to fix node p to 0 and to 1 and compute corresponding partial labelings $z^0$ and $z^1$. The labeling z may be updated as follows: z:=FUSE(z, $z^i$) where i=$x_p$. Fix and contract operations preserve the "structure" of z, e.g. if node q is fixed to label j during QPBOP then there must hold $x_q$=j. Let y be the transformed labeling for energy E'. It can be verified by induction that if constant C in QPBOP is sufficiently large (namely, E(z)<$\min_z$ E(z)+C) then there holds E'(y)=E(f(y))≤E(x). After QPBOP, QPBOI is run for energy E' starting with labeling y.

The improved fully labeled solution generated using one of the methods described herein may be used in many different applications within computer vision. For example, the improved fully labeled solution may be used in displaying the image, e.g. with foreground/background distinguished or with identified objects labeled. The table below shows a comparison of different methods of labeling pixels when applied to various computer vision tasks. In each case, the energy, scaled to the range 0 to 999 is given with the run time in seconds given in parentheses. BC stands for boundary constraint and RC for region constraint.

| Applications | Sim. An. | ICM | GC | BP | BP + I |
|---|---|---|---|---|---|
| Diagram recognition (4.8con) | 0 (0.28 s) | 999 (0 s) | 119 (0 s) | 25 (0 s) | 0 (0 s) |
| New View Synthesis (8con) | — | 999 (0.2 s) | 2 (0.3 s) | 18 (0.6 s) | 0 (2.3 s) |
| Super-resolution (8con) | 7 (52 s) | 68 (0.02 s) | 999 (0 s) | 0.03 (0.01 s) | 0.001 (0.06 s) |
| Image Segm. 9BC + 1 Fgd Pixel (4con) | 983 (50 s) | 999 (0.07 s) | 0 (28 s) | 28 (0.2 s) | 0 (31 s) |
| Image Segm. 9BC; 4RC (4con) | 900 (50 s) | 999 (0.04 s) | 0 (14 s) | 24 (0.2 s) | 0 (3 s) |
| Texture restoration (15con) | 15 (165 s) | 636 (0.26) | 999 (0.5 s) | 19 (0.18 s) | 0.01 (2.4 s) |
| Deconvolution 3 × 3 kernel (24con) | 0 0.4 s) | 14 (0 s) | 999 (0 s) | 5 (0.5 s) | 3.6 (1 s) |
| Deconvolution 5 × 3 kernel (80con) | 0 (1.3 s) | 6 (0.03 s) | 999 (0 s) | 71 (0.9 s) | 8.1 (31 s) |

It can be seen from this table that the QPBOI method, when used in conjunction with BP (i.e. BP+I), results in lower resultant energies in all cases and that the run time taken is still acceptable.

Figure 5:
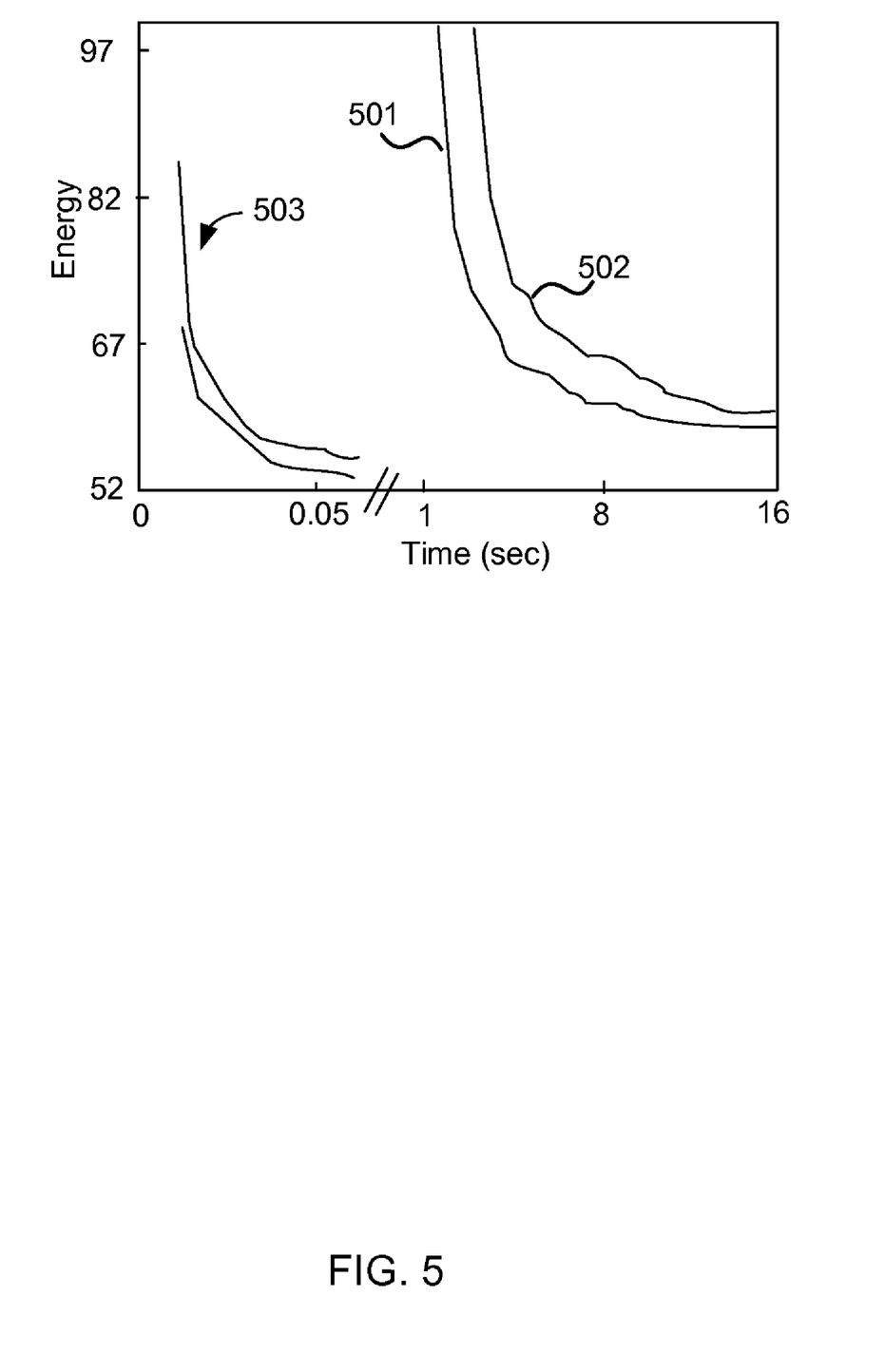
FIG. 5 shows a graph of the performance of QPBOI dependent upon the starting reference solution.

FIG. 5 shows a graph of the performance of QPBOI dependent upon the starting reference solution. These results were produced using a 4-connected random graph in normal form of size 100×100 pixels with 50% non-submodular terms and unary strength 0.8. In each case, QPBOI was stopped when the energy did not decrease for 5 iterations. The graph shows that with BP as a starting point (curve 501), a consistently better result is obtained compared to a random starting point (curve 502). The graph also shows that where an improved starting point can be used, such as improved versions of QPBO (as in curves 503), QPBOI still provides further improvements.

Whilst the above methods refer to the labeling of pixels with one of two labels, this is by way of example only. QPBOI is applicable to multi-label problems and can either be used to consider all the labels simultaneously or can be used in iterative selection of pairs of labels. There are various ways that iterative selection of labels may be implemented and QPBOI can be used in any situation to improve an initial reference (or approximate) solution. In an example where there are 5 possible labels, this can be viewed as a sequence of binary problems: label 1 or 2, keep current label or label 3, keep current label or label 4, keep current label or label 5. QPBOI may be used at each stage or alternatively, QPBOI may be used at the final stage (keep current or label 5) with the output of the previous stage providing the initial reference solution.

Figure 6:
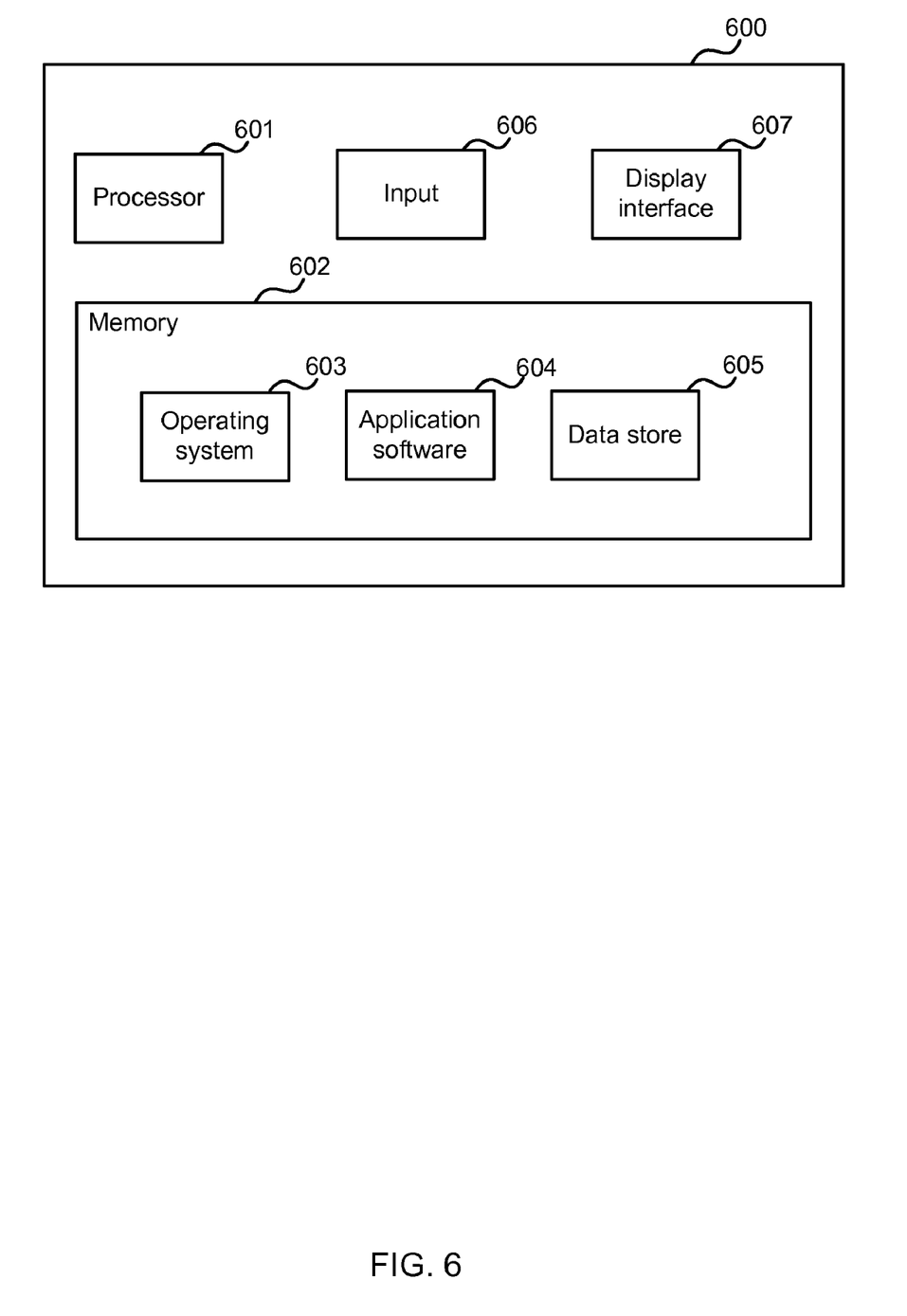
FIG. 6 illustrates an exemplary computing-based device in which embodiments of the methods described herein may be implemented.

FIG. 6 illustrates various components of an exemplary computing-based device 600 which may be implemented as any form of a computing and/or electronic device, and in which embodiments of the methods described above may be implemented. Such a device may be referred to as an image processing system although the system may be capable of other functions and applications.

Computing-based device 600 comprises one or more processors 601 which may be microprocessors, controllers or any other suitable type of processors for processing computing executable instructions to control the operation of the device in order to perform any aspects of the pixel labeling methods described above. Computer executable instructions may be provided using any computer-readable media, such as memory 602. The memory is of any suitable type such as random access memory (RAM), a disk storage device of any type such as a magnetic or optical storage device, a hard disk drive, or a CD, DVD or other disc drive. Flash memory, EPROM or EEPROM may also be used. Platform software comprising an operating system 603 or any other suitable platform software may be provided at the computing-based device to enable application software 604 to be executed on the device. The operating system and application software may be stored in the memory 602. The memory may also comprise a data store 605 for storing the solutions and/or the internal structures which may be re-used when QPBO is run more than once. The data store may also be used for storing labeled images.

The computing-based device 600 may further comprise one or more inputs and outputs. An input may be of any suitable type for receiving media content, Internet Protocol (IP) input etc. In an example an input 606 may be provided to receive one or more of the image data, the partially labeled solution and the initial fully labeled reference solution. An output may comprise an audio and/or video output to a display system integral with or in communication with the computing-based device, such as display interface 607. The display system may provide a graphical user interface or other user interface of any suitable type, although this is not essential. The device may also comprise a communication interface (not shown in FIG. 6).

Although the present examples are described and illustrated herein as being implemented in a computing system as shown in FIG. 6, the system described is provided as an example and not a limitation. As those skilled in the art will appreciate, the present examples are suitable for application in a variety of different types of computing systems/devices.

Whilst in the above examples, the solution to be improved is described as approximate, this only refers to the fact that it is sought to improve this solution. The solution may, for example, be a good solution generated using a variant of QPBO.

Although in the methods described above the pixels (or nodes) p are selected randomly to be fixed, in other examples the pixels (or nodes) may be selected in a defined order or according to any heuristic. Whilst the above description refers to the fixing of one pixel per iteration, this is by way of example only and more than one pixel may be selected and fixed in any iteration of QPBOI.

The methods relate to assigning labels to pixels within an image, where the image may be of any kind and may comprise text (e.g. writing in electronic ink), drawings, pictures, photographs or other captured images etc.

Whilst the methods and algorithms are described above in relation to solving computer vision problems, these methods and algorithms are also applicable to other fields where it is necessary to solve similar optimization problems. For example, the methods and algorithms are applicable to optimization problems in the field of VLSI design.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a storage medium. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A computer implemented method of improving labeling of pixels in an image, the method operable on a processor, the method comprising:
   calculating, by the processor, an energy for a partially labeled solution and at least one unlabeled pixel, wherein said at least one unlabeled pixel is assigned a label corresponding to a fully labeled solution;
   computing, by the processor, a new labeled solution based on said energy for the partially labeled solution and said at least one unlabeled pixel using a quadratic pseudo-boolean optimization algorithm; and
   updating labels in the fully labeled solution to correspond to the new labeled solution.

2. A method according to claim 1, further comprising, prior to calculating said energy for the partially labeled solution and said at least one unlabeled pixel:
   selecting said at least one unlabeled pixel from a partially labeled solution for the image.

3. A method according to claim 2, further comprising:
   accessing an ordering of pixels;
   and wherein selecting said at least one unlabeled pixel from a partially labeled solution for the image comprises:
   selecting at least one pixel according to the ordering of pixels;
   determining if said at least one pixel is unlabeled based on the partially labeled solution; and
   when said at least one pixel is not unlabeled, repeating the selecting and determining steps.

4. A method according to claim 1, further comprising:
   storing the new labeled solution.

5. A method according to claim 4, wherein storing the new labeled solution comprises:
   storing an image labeled according to the new labeled solution.

6. A method according to claim 5, further comprising:
   displaying the image labeled according to the new labeled solution in a user interface of an image processing tool.

7. A method according to claim 1, further comprising:
   generating the fully labeled solution using one of belief propagation and random label assignment.

8. A method according to claim 1, further comprising:
   computing said partially labeled solution from said fully labeled solution using the quadratic pseudoboolean optimization algorithm.

9. A method according to claim 1, further comprising:
   repeating the calculating, computing, and updating until the fully labeled solution has not changed for a predetermined number of iterations.

10. A method according to claim 1, wherein calculating an energy for said partially labeled solution and said at least one unlabeled pixel is based on an energy function having the form:

$$E(x) = \theta_{const} + \sum_{p \in v} \theta_p(x_p) + \sum_{(p,q) \in \varepsilon} \theta_{pq}(x_p, x_q)$$

wherein $\theta_{const}$ is a constant, p and q represent nodes of the set of nodes V const corresponding to pixels of the image, $\theta$ resents a vector and $x_p$ and $x_q$ represent values of nodes p and q respectively.

11. A method according to claim 1, wherein each label is selected from a set comprising two or more possible labels.

12. A computer implemented method of improving labeling of pixels in an image, the method operable on a processor, the method comprising:
   selecting one or more unlabeled pixels from a partially labeled solution;
   assigning each of said one or more unlabeled pixels a label based on a corresponding pixel label in a fully labeled solution to create one or more newly labeled pixels;
   calculating, by the processor, an energy for the partially labeled solution with the addition of said one or more newly labeled pixels using an energy function;

generating a new partially labeled solution using said energy and a quadratic pseudoboolean optimization algorithm; and updating labels in the fully labeled solution to correspond to labels in the new partially labeled solution.

13. A method according to claim 12, further comprising:

storing a labeled version of the image, the labeled version comprising pixels assigned labels according to the updated fully labeled solution.

14. A method according to claim 13, further comprising:

displaying the labeled version of the image in a user interface of an image processing application.

15. A method according to claim 12, further comprising, prior to selecting one or more unlabeled pixels:

calculating an energy for an approximate pixel labeling solution using said energy function;

generating said partially labeled solution using said energy for the approximate pixel labeling solution and said quadratic pseudoboolean optimization algorithm;

updating labels in the approximate pixel labeling solution based on the partially labeled solution to create said fully labeled solution.

16. A method according to claim 15, wherein said approximate pixel labeling solution is generated using one of belief propagation and random allocation of labels.

17. A method according to claim 12, wherein said fully labeled solution is generated using one of belief propagation and random allocation of labels.

18. An image processing system comprising:

a processor; and a memory arranged to store executable instructions arranged to cause the processor to:

select one or more unlabeled pixels from a partially labeled solution;

assign each of said one or more unlabeled pixels a label based on a corresponding pixel label in a fully labeled solution to create one or more newly labeled pixels;

calculate an energy for the partially labeled solution with the addition of said one or more newly labeled pixels using an energy function;

generate a new partially labeled solution using said energy and a quadratic pseudoboolean optimization algorithm; and update labels in the fully labeled solution to correspond to labels in the new partially labeled solution.

19. An image processing system according to claim 18, further comprising:

a data store, and wherein the memory is further arranged to store executable instructions arranged to cause the processor to:

store the fully labeled solution with updated labels in the data store.

20. An image processing system according to claim 18, further comprising:

an interface to a display, and wherein the memory is further arranged to store executable instructions arranged to cause the processor to:

store a labeled version of the image, the labeled version comprising pixels assigned labels according to the updated fully labeled solution; and display the labeled version of the image in a user interface of an image processing application.

* * * * *

UNITED STATES PATENT AND TRADEMARK OFFICE
CERTIFICATE OF CORRECTION

| | | |
|---|---|---|
| PATENT NO. | : 8,041,114 B2 | Page 1 of 1 |
| APPLICATION NO. | : 11/764002 | |
| DATED | : October 18, 2011 | |
| INVENTOR(S) | : Carsten Rother et al. | |

It is certified that error appears in the above-identified patent and that said Letters Patent is hereby corrected as shown below:

In column 10, line 52, in Claim 10, after "V" delete "const".

In column 10, line 53, in Claim 10, after "vector" insert -- , --.

Signed and Sealed this
Sixth Day of December, 2011

David J. Kappos
*Director of the United States Patent and Trademark Office*